United States Patent [19]

Yu et al.

[11] Patent Number: 5,219,983

[45] Date of Patent: Jun. 15, 1993

[54] PREPARATION OF POLY (BIPHENYLENE/PHENYLENE) SULFIDE

[75] Inventors: Michael C. Yu; Jimmie J. Straw, both of Bartlesville, Okla.

[73] Assignee: Phillips Petroleum Company, Bartlesville, Okla.

[21] Appl. No.: 697,034

[22] Filed: May 8, 1991

[51] Int. Cl.$^5$ .............................................. C08G 75/16
[52] U.S. Cl. .................................................... 528/388
[58] Field of Search .......................................... 528/388

[56] References Cited

U.S. PATENT DOCUMENTS

| | | | |
|---|---|---|---|
| 3,354,129 | 11/1967 | Edmonds et al. | 260/79 |
| 3,819,407 | 6/1974 | Oates et al. | 117/138.8 N |
| 3,894,983 | 7/1975 | Highbee | 260/37 R |
| 3,919,177 | 11/1975 | Campbell | 260/79.1 |
| 3,988,286 | 10/1976 | Edmonds et al. | 260/37 R |
| 4,116,947 | 9/1978 | Edmonds | 528/388 |
| 4,504,551 | 3/1985 | Leland | 428/419 |
| 4,527,219 | 7/1985 | Johnson et al. | 361/323 |
| 4,528,335 | 7/1985 | Selby et al. | 525/420 |
| 4,708,983 | 11/1987 | Liang | 525/101 |
| 4,743,639 | 5/1988 | Liang | 524/188 |
| 4,797,488 | 1/1989 | Stack et al. | 544/295 |
| 4,837,294 | 6/1989 | Ichikawa et al. | 528/388 |
| 4,970,261 | 11/1990 | Yu | 524/609 |
| 5,093,468 | 3/1992 | Köhler | 528/388 |

Primary Examiner—Harold D. Anderson
Attorney, Agent, or Firm—Ryan N. Cross

[57] ABSTRACT

Poly(biphenylene sulfide/poly(phenylene sulfide) copolymers are produced by contacting a p-dihalobenzene and a bis-p-halobiphenyl under polymerization conditions. Additionally a poly(biphenylene sulfide)/poly(phenylene sulfide) copolymer/fiber reinforced composite is provided.

19 Claims, No Drawings

PREPARATION OF POLY (BIPHENYLENE/PHENYLENE) SULFIDE

This invention relates to the production of poly(biphenylene sulfide).

The use of bis-p-halobiphenyl with $Na_2S$ to make poly(biphenylene sulfide) (PBPS) is known. However, PBPS has a high melting temperature that requires high processing or fabrication temperatures. A polymer requiring lower processing temperatures but exhibiting high temperature retention of mechanical properties is desired.

It is an object of this invention to produce a copolymer that has lower processing temperatures than PBPS.

It is a further object of this invention to produce a copolymer that maintains its mechanical properties and hardness at elevated temperatures.

In accordance with one aspect of this invention there is provided a process for the production of a poly(biphenylene sulfide)/poly(phenylene sulfide) copolymer comprising contacting a p-dihalobenzene and a bis-p-halobiphenyl in an amount of about 1 to 19 moles bis-p-halobiphenyl per mole of said p-dihalobenzene under polymerization conditions sufficient to form said copolymer.

According to another aspect of this invention there is provided a poly(biphenylene sulfide)/poly(phenylene sulfide) copolymer having a poly(biphenylene sulfide) unit to poly(phenylene sulfide) unit ratio in the range of about 1:1 to 19:1.

According to a further aspect of this invention there is provided an article comprising a poly(biphenylene sulfide)/poly(phenylene sulfide) copolymer and an reinforcing fiber. Other objects and aspects of the invention will be apparent to those skilled in the art upon a study of the specification and the appended claims.

In this application the term "homopolymer" is used in its customary sense to denote polymeric materials prepared, except for minor amounts of incidental impurities, from a single monomer. The term "copolymer" is used to denote polymeric materials prepared from two or more monomers and thus, for convenience, also extends to terpolymers and higher combinations. The term "polymer" is used broadly to denote homopolymers as well as copolymers as defined above.

The poly(biphenylene sulfide)/poly(phenylene sulfide) copolymer of this invention may be produced by conventional polymerization methods such as those broadly disclosed in Campbell, U.S. Pat. No. 3,919,177, and Edmonds and Scoggins, U.S. Pat. No. 4,116,947, the disclosures of which are hereby incorporated by reference.

The process of making the copolymer of the present invention generally comprises reacting at least one p-dihalobenzene with at least one bis-p-halobiphenyl and a mixture of at least one suitable source of sulfur, at least one alkali metal carboxylate and at least one organic amide. With suitable sulfur sources other alkali metal sulfides and alkali metal bisulfides, at least one base is also required. Also, it is preferable to use a base when the alkali metal bisulfides are employed as the sulfur sources. The resulting solution is heated for a period of time to allow polymerization to occur. After the crude polymer product is formed, it is preferably cooled, washed and filtered and then air dried.

The components used in the preparation of the poly(biphenylene sulfide)/poly(phenylene sulfide) copolymer can be introduced into contact in any order. Water which can be present in any composite formed from any of the components or which can be present in any of the individual components can be removed, for example, by distillation, prior to conducting the polymerization reaction.

Although the ratio of the components can vary considerably, the molar ratio of the alkali metal sulfides, $M_2S$, to bis-p-halobiphenyl and p-dihalobenzene compounds should be generally within the range of from about 0.90:1.0 to about 1.10:1.0 and preferably from 0.95:1.0 to 1.05:1.0. The moles of alkali metal carboxylate per mole of bis-p-halobiphenyl and p-dihalobenzene compounds should be within the range of from about 0.05 moles to about 2.0 moles and preferably from about 0.10 moles to about 0.50 moles. The moles of organic amide per mole of bis-p-halobiphenyl and p-dihalobenzene compounds are typically within the range of from about 2.0 moles to about 20 moles. The molar ratio of bis-p-halobiphenyl to p-dihalobenzene should be in the range of from about 50:50 to about 95:5 moles bis-p-halobiphenyl per mole p-dihalobenzene, preferably in the range of about 70:30 to about 90:10 and most preferably about 80:20. The components used in the preparation of poly(biphenylene sulfide)/poly(phenylene sulfide) copolymer can be introduced into contact in any order in a suitable reactor. The polymerization can be conducted over a wide range in temperature, but will generally be within the range from about 200° C. to about 350° C. and preferably from about 250° C. to about 300° C.

The reaction time will generally be within the range of from about 0.50 hours to about 20 hours and preferably from about 2.0 hours to about 6.0 hours. The pressure can be whatever is necessary to convert a substantial portion of the reactants to the copolymer and will generally be in the range of from about 200 psi (about $1.3 \times 10^6$ Pa) to about 400 psi (about $2.8 \times 10^6$ Pa).

The poly(biphenylene sulfide)/poly(phenylene sulfide) copolymers produced by the process of this invention can be separated from the reaction mixture by conventional procedures. For example, by filtration of the copolymer followed by washing with water. The poly(biphenylene sulfide)/poly(phenylene sulfide) copolymers produced by the process of this invention will have a biphenylene sulfide unit to phenylene sulfide unit ratio in the range of about 50:50 to about 95:5.0. Preferably, about 70:30 to about 90:10. Most preferably, about 80:20.

The poly(biphenylene sulfide)/poly(phenylene sulfide) copolymers of this invention can be used for high strength and thermally stable compositions by coating substrates such as steel or aluminum or by impregnation of fibers or cloths of materials such as carbon, metals, or glass with the copolymers of this invention. In the case of coatings, the coating operation is generally followed by appropriate curing conditions. Procedures for forming fiber reinforced composites are known in the art and may be used with the copolymers of this invention. Typical processes involve pultrusion or impregnating a fiber with a slurry of copolymer followed by drying and molding.

p-Dihalobenzenes which can be employed in the process of this invention can be represented by the formula.

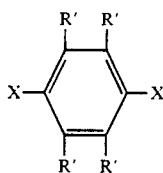

where each X is selected from the group consisting of chlorine, bromine, fluorine, and iodine, and each R' is selected from the group consisting of hydrogen and hydrocarbyl in which the hydrocarbyl can be alkyl, cycloalkyl, and aryl radicals and combinations thereof such as alkaryl, aralkyl, and the like, the total number of carbon atoms in each molecule being within the range of 6 to about 24, with the proviso that in at least 50 mole percent of the p-dihalobenzene employed, each R' must be hydrogen. The term p-dihalobenzene as used in this application denotes the description as given above.

Examples of some p-dihalobenzenes which can be employed in the process of this invention include p-dichlorobenzene, p-dibromobenzene, p-difluorobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures of two or more thereof.

The bis-p-halobiphenyl used in this invention is selected from the group consisting of 4,4'-difluorobiphenyl, 4,4'-dibromobiphenyl, 4,4'-diiodobiphenyl, and 4,4'-dichlorobiphenyl preferably 4,4'-diflurobiphenyl and 4,4'-dibromobiphenyl.

Alkali metal carboxylates which can be employed in the process of this invention can be represented by the formula $RCO_2M$ where R is a hydrocarbyl radical selected from alkyl, cycloalkyl, and aryl and combinations thereof such as alkylaryl, alkylcycloalkyl, cycloalkylalkyl, arylalkyl, arylcycloalkyl, alkylarylalkyl and alkylcycloalkylalkyl, the hydrocarbyl radical having 1 to about 20 carbon atoms, and M is an alkali metal selected from the group consisting of lithium, sodium, potassium, rubidium and cesium. Preferably, R is an alkyl radical having 1 to about 6 carbon atoms or a phenyl radical and M is lithium or sodium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and mixtures of two or more thereof.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures of two or more thereof.

Any suitable sulfur sources can be used in this invention including alkali metal sulfides and alkali metal bisulfides. Alkali metal sulfides are preferred. Alkali metal sulfides useful in this invention are represented by the formula $M_2S$ which includes the mono sulfides of lithium, sodium, potassium, rubidium and cesium. The alkali metal sulfide can be used in anhydrous form, as a hydrite or an aqueous mixture. If desired, the alkali metal sulfide can be produced by reaction of hydrogen sulfide or sodium hydrosulfide with sodium hydroxide in an aqueous medium. No bases need be employed with the alkali metal sulfides; however, bases which can be employed include lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate and mixtures thereof. If desired, the hydroxide can be produced in situ by the reaction of the corresponding oxide with water.

EXAMPLES

The following examples demonstrate that poly(biphenylene sulfide)/poly(phenylene sulfide) copolymer has a lower processing temperature than poly(biphenylene sulfide) homopolymer. Additionally, the examples show that the copolymer of this invention maintains its mechanical properties at elevated temperatures. Values for the storage modulus retention were determined by the ASTM D4065 method of solid state Rheological Dynamic Spectrum (RDS) wherein storage modulus retention is simply the storage modulus at the desired test temperature expressed of the storage modulus measured at ambient room temperature. Values for the longitudinal Flexual Modulus and Strength were determined using standard ASTM test D790.

Control 1

This control demonstrates the preparation of poly(biphenylene sulfide) homopolymer.

Polymerizations were typically carried out in stainless steel autoclaves of one-liter to two-gallon size equipped with stirrer generally run at 200-400 rpm. To the reactor were charged a measured amount of an aqueous sodium hydrosulfide solution of known concentration (generally 45-65 weight percent), a 2-4 mole percent excess (based on the sodium hydrosulfide) of sodium hydroxide, an equimolar amount (based on the sodium hydrosulfide) of a 4,4'-dihalobiphenyl (either the difluoro or dibromo analog) and a 6-8-fold molar excess (based on the sodium hydrosulfide) of N-methyl-2-pyrrolidone. The temperature was raised to 240°-260° C. and held there for 30-90 minutes. The temperature was then raised to 290°-310° C. and held there for 90-150 minutes. The pressure of the reactor was generally in the range of 320-400 psig at the end of the heating period. The heat was then turned off and air at ambient temperature was introduced through a cooling coil in the reactor with the stirrer still running. Thirty to 90 minutes later, the stirrer and air were turned off and the reactor was allowed to continue cooling overnight. The next day, the reactor was opened and the polymer was removed and washed 4-10 times with hot deionized water. The washed polymer was then dried to a constant weight in a forced air oven at 120°-140° C. Typical yields were 95-99 percent theory.

Control 2

This control demonstrates the preparation of plain weave carbon fabric reinforced poly(biphenylene sulfide) composite material.

A slurry of the homopolymer was made, according to the process of control 1, by mixing 30-70 grams of the polymer with 100-150 grams of water in a blender. The slurry was applied with a paint brush to both sides of a piece of plain weave carbon fabric. The samples thus made were dried in an oven at 140°-160° C. for 1-2 hours. The desired number of such pieces were stacked, sandwiched between aluminum sheets and iron plates and subjected to 450°-460° C. for 3-7 minutes at contact pressure in a hydraulic press. The laminating structure, including the metal plates, was then transferred to a second press at ambient temperature where 1.5-2.5 tons pressure was applied for 2-5 minutes. The resulting specimens were then trimmed to fit a picture frame mold of the desired size. The picture frame and composite sheets were sandwiched between two aluminum foils and iron plates and subjected to 450°-460° C. at contact pressure for 8-12 minutes in a hydraulic press. The structure, complete with metal plates, was then transferred to a second press at ambient temperature and the composite was consolidated under 1.5-2.5 tons of pressure. The resulting composite slab was then evaluated for mechanical properties.

EXAMPLE 1

This example demonstrates the preparation of a poly(biphenylene sulfide)/poly(phenylene sulfide) copolymer.

Procedure and conditions were generally the same as outlined in Control 1 except that 0.45-0.55 mole of sodium acetate per mole of sodium hydrosulfide was also charged to the reactor and the molar amounts of bis-p-halobiphenyl and p-dichlorobenzene charged total the same as the molar amount of sodium hydrosulfide charged and were used in the ratio desired in the product copolymer (e.g., 9/1 for a desired 90/10 poly(biphenylene sulfide)/poly(phenylene sulfide) copolymer).

EXAMPLE 2

This example demonstrates the preparation of plain weave carbon fabric reinforced poly(biphenylene sulfide/poly(phenylene sulfide) copolymer composite material. The copolymer used was a 90/10 poly(biphenylene sulfide)/poly(phenylene sulfide) copolymer made according to the process of Example 1.

A slurry of the copolymer was made by mixing 30-70 grams of the copolymer with 100-150 grams of water in a blender. The slurry was applied with a paint brush to both sides of a piece of plain weave carbon fabric. The samples thus made were dried in an oven at 140°-160° C. for 1-2 hours. The desired number of such pieces were stacked, sandwiched between aluminum sheets and iron plates and subjected to 425°-440° C. for 3-7 minutes at contact pressure in a hydraulic press. The laminating structure, including the metal plates, was then transferred to a second press at ambient temperature where 1.5-2.5 tons pressure was applied for 2-5 minutes. The resulting specimens were then trimmed to fit a picture frame mold of the desire size. The picture frame and composite sheets were sandwiched between two aluminum foils and iron plates and subjected to 425°-440° C. at contact pressure for 8-12 minutes in a hydraulic press. The structure, complete with metal plates, was then transferred to a second press at ambient temperature and the composite was consolidated under 1.5-2.5 tons of pressure. The resulting composite slab was then evaluated for mechanical properties.

EXAMPLE 3

This example allows a comparison to be made between the composite molding conditions required and the storage modulus retention of poly(biphenylene sulfide) homopolymer made by the process of Control 2 and 90/10 poly(biphenylene sulfide/poly(phenylene sulfide) copolymer made from difluorobiphenyl starting material by the process of Example 2.

TABLE I

| Polymer | Holding Temperature. °C. | Storage Modulus Retention | |
|---|---|---|---|
| | | at 354° F. | at 450° F. |
| 90/10 Copolymer | 425-440 | 103% | 71% |
| Homopolymer | 450-460 | 82% | 56% |

The data in Table I show that the copolymer requires a lower temperature for molding than does the homopolymer. Also, unexpectedly, the data show that the storage modulus retention is greater for the copolymer than for the homopolymer at both temperatures tested.

EXAMPLE 4

This example demonstrates the preparation of unidirectional carbon fiber reinforced poly(biphenylene sulfide) composite made from the homopolymer of Control 1.

A pultrusion technique was used, such that described in U.S. Pat. No. 4,680,224. Line speed was 20-30 inches per minute, die temperature was 440°-465° C. and drying chamber temperature was 277°-288° C. Fiber content of the product was 55-65 weight percent.

EXAMPLE 5

This example demonstrates the preparation of unidirectional carbon fiber reinforced poly(biphenylene sulfide)/poly(phenylene sulfide) copolymer composite. The particular copolymer used for this example was a 90/10 poly(biphenylene sulfide)/poly(phenylene sulfide) copolymer made by the process of Example 1.

A pultrusion technique was used, such as that described in U.S. Pat. No. 4,680,224. Methylene chloride was used as slurry bath liquid. Die temperature was 442°-446° C. and drying chamber temperature was 171°-264° C. Fiber content of the product was 54-63 weight percent.

EXAMPLE 6

This example allows a comparison of the properties of unidirectional carbon fiber composite properties made using poly(biphenylene sulfide) homopolymer of Example 4, 80/20 poly(biphenylene sulfide)/poly(phenylene sulfide) copolymer made by the process of Example 5 and 70/30 poly(biphenylene sulfide)/poly(phenylene sulfide) copolymer made by the process of Example 5, all made using polymers prepared from the difluorobiphenyl starting material.

TABLE II

| Property | Homo-polymer | 80/20 Co-polymer | 70/30 Co-polymer |
|---|---|---|---|
| Long. Flexural Modulus, MSI at | | | |
| 75° F. | 13.80 | 12.44 | 13.16 |
| 300° F. | 13.44 | 13.03 | 13.50 |
| 400° F. | 13.00 | 11.97 | 11.39 |
| 500° F. | 12.33 | 11.35 | 8.92 |
| Long. Flexural Strength, KSI at | | | |
| 75° F. | 94.75 | 115.80 | 117.05 |
| 300° F. | 96.24 | 105.64 | 91.43 |
| 400° F. | 90.02 | 71.45 | 47.46 |
| 500° F. | 53.54 | 54.71 | 35.00 |

The data in Table II show that the composite from the homopolymer exhibits somewhat superior longitudinal flexural modulus and strength at 400° and 500° F. than do the composites from the two copolymers. However, both copolymer composites demonstrated an ability to maintain their mechanical properties at elevated temperatures. Especially the 80/20 copolymer composite which suffered only a 8.8 percent drop in the longitudinal flexural modulus from 75° F. to 500° F. compared to 10.6 percent for the homopolymer composite. The 80/20 copolymer composite did suffer a slightly greater longitudinal flexural strength drop over the same range than did the homopolymer composite, 52.8 percent and 43.5 percent respectively. However, while suffering a greater flexural strength drop the 80/20 copolymer composite had better longitudinal flexural strength at each temperature except the 400° F. The 70/30 copolymer composite did not retain its longitudinal flexural modulus or longitudinal flexural strength as well as the 80/20 copolymer or the homopolymer at the higher temperatures, but it did exhibit superior longitudinal flexural strength at 75° F. than either of the other polymers.

EXAMPLE 7

This example allows a comparison to be made of the properties of unidirectional carbon fiber composite made from 90/10 and 80/20 poly(biphenylene sulfide)/poly(phenylene sulfide) copolymers wherein the polymers were made using the dibromobiphenyl starting material and the process of Example 5.

TABLE III

| Property | 90/10 Copolymer | 80/20 Copolymer |
|---|---|---|
| Long. Flexural Modulus, MSI at | | |
| 75° F. | 15.39 | 11.29 |
| 300° F. | 11.62 | 11.31 |
| 400° F. | 12.15 | 10.39 |
| 500° F. | 10.63 | 9.34 |
| Long. Flexural Strength, KSI at | | |
| 75° F. | 166.80 | 110.60 |
| 300° F. | 108.74 | 91.42 |

TABLE III-continued

| Property | 90/10 Copolymer | 80/20 Copolymer |
|---|---|---|
| 400° F. | 85.31 | 65.04 |
| 500° F. | 51.30 | 41.35 |

The data in Table III show that the 90/10 copolymer composite generally has superior longitudinal flexural modulus and strength at a given temperature than does the corresponding composite from the 80/20 copolymer.

EXAMPLE 8

This example allows a comparison to be made of the properties of unidirectional carbon fiber composite made from 80/20 poly(biphenylene sulfide)/poly(phenylene sulfide) copolymer, wherein the copolymer was made from either the dibromobiphenyl or difluorobiphenyl starting material and the process of Example 5.

TABLE IV

| Property | Monomer Used in Polymer Preparation | |
|---|---|---|
| | Difluorobiphenyl | Dibromobiphenyl |
| Long. Flexural Modulus, MSI at | | |
| 75° F. | 12.44 | 11.29 |
| 300° F. | 13.03 | 11.31 |
| 400° F. | 11.97 | 10.39 |
| 500° F. | 11.35 | 9.34 |
| Long. Flexural Strength, KSI at | | |
| 75° F. | 115.80 | 110.60 |
| 300° F. | 105.64 | 91.42 |
| 400° F. | 71.45 | 65.04 |
| 500° F. | 54.71 | 41.35 |

The data in Table IV show that polymer made using the difluorobiphenyl starting material produces unidirectional carbon fiber composite exhibiting superior longitudinal flexural modulus and strength than does the corresponding composite made from polymer made using the dibromobiphenyl starting material.

In general, the above examples illustrate that the copolymer blends achieve the objectives of producing a copolymer requiring a lower processing temperature than PBPS homopolymer and maintaining the mechanical properties and hardness of the copolymer at elevated temperatures. Additionally, the unexpected result of a copolymer with a greater storage modulus retention than the PBPS homopolymer was obtained as shown in Table I.

That which is claimed is:

1. A process for the production of poly(biphenylene sulfide)/polyphenylene sulfide) copolymer which comprises contacting a p-dihalobenzene, a bis-p-halobiphenyl in an amount from about 2.3 to about 9.0 mols of said bis-p-halobiphenyl per mol of said p-dihalobenzene, at least one alkali metal sulfide, at least one organic amide and at least one alkali metal carboxylate under polymerization conditions sufficient to form said copolymer.

2. A process according to claim 1 wherein said at least one alkali metal sulfide is selected from the group consisting of sodium sulfide, potassium sulfide, rubidium sulfide, cesium sulfide, lithium sulfide and mixtures of two or more thereof.

3. A process in accordance with claim 1 wherein at least one organic amide is selected from the group consisting of formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, $\epsilon$-caprolactam, N-methyl-$\epsilon$-caprolactam, N,N'-ethylenedi-2-pyrrolidone, hexamethylphosphoramide, tetramethylurea, and the like, and mixtures of two or more, thereof.

4. A process according to claim 1 wherein said at least one alkali metal carboxylate has a formula $RCO_2M$ where R is a hydrocarbyl radical and M is an alkali metal and the hydrocarbyl radical is selected from alkyl, cycloalkyl, and aryl and combinations thereof such as alkylaryl, alkylcycloalkyl, cycloalkylalkyl, arylalkyl, arylcycloalkyl, alkylarylalkyl and alkylcycloalkylakyl, said hydrocarbyl radicals having 1 to about 20 carbon atoms, said alkali metal of said alkali metal carboxylate is selected from the group consisting of lithium, sodium, potassium, rubidium and cesium.

5. A process according to claim 1 wherein:
said p-dihalobenzene is selected from the group consisting of p-dibromobenzene, p-dichlorobenzene, p-diiodobenzene, and p-difluorobenzene;
said bis-p-halobiphenyl is selected from a group consisting of 4,4'-difluorobiphenyl, 4,4'-dibromobiphenyl, 4,4'-diiodobiphenyl, and 4,4'-dichlorobiphenyl;
said alkali metal sulfide is selected from the group consisting of sodium sulfide, potassium sulfide, rubidium sulfide, cesium sulfide, lithium sulfide and mixtures of one or more thereof;
said organic amide is selected from the group consisting of formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, $\epsilon$-caprolactam, N-methyl-$\epsilon$-caprolactam, N,N'-ethylenedi-2-pyrrolidone, hexamethylphosphoramide, tetramethylurea, and mixtures of two or more, thereof;
said alkali metal carboxylate is selected from the group consisting of lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate potassium benzoate, lithium benzoate, sodium benzoate, potassium m-toluate, lithium phenylacetate, sodium 4-phenylcyclohexane-carboxylate, potassium p-tolylacetate, lithium 4-ethylcyclohexylacetate, and mixtures of two or more thereof.

6. A process according to claim 5 wherein said p-dihalobenzene is p-dichlorobenzene and said bis-p-halobiphenyl is 4,4'-diflorobiphenyl.

7. A process in accordance with claim 6 wherein said 4,4'-difluorobiphenyl is in an amount of about 4 moles per mole of said p-dichlorobenzene.

8. A process in accordance with claim 5 wherein said p-dihalobenzene is p-dichlorobenzene and said bis-p-halobiphenyl is 4,4'-dibromobiphenyl.

9. A process in accordance with claim 8 wherein said 4,4'-dibromobiphenyl is the amount of about 4 moles per mole of said p-dichlorobenzene.

10. A process for the production of a poly(biphenylene sulfide)/poly(phenylene sulfide) copolymer which comprises;
contacting a p-dihalobenzene;
a bis-p-halobiphenyl in the amount of about 2.3 to 9.0 moles per mole of said p-dihalobenzene;
aqueous sulfide selected from the group consisting of sodium sulfide, sodium hydrosulfide and mixtures thereof;
sodium hydroxide;
at least one organic amide; and
at least one alkali metal carboxylate.

11. A process according to claim 10 wherein said at least one organic amide is selected from the group consisting of formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, $\epsilon$-caprolactam, N-methyl-$\epsilon$-caprolactam, N,N'-ethylenedi-2-pyrrolidone, hexamethylphosphoramide, tetramethylurea, and mixtures of two or more, thereof.

12. A process in accordance with claim 10 wherein said at least one alkali metal carboxylate has the formula $RCO_2M$ wherein R is a hydrocarbyl radical and M is an alkali metal, said hydrocarbyl radical is selected from the group consisting of alkyl, cycloalkyl, and aryl and combinations thereof such as alkylaryl, alkylcycloalkyl, cycloalkylalkyl, arylalkyl, arylcycloalkyl, alkylarylalkyl and alkylcycloalkylalkyl radicals having 1 to about 20 carbon atoms, said alkali metal of said alkali metal carboxylate is selected from the group consisting of lithium, sodium, potassium, rubidium and cesium.

13. A process in accordance with claim 10 wherein said p-dihalobenzene is selected from the group consisting of p-dibromobenzene, p-dichlorobenzene, p-diiodobenzene, and p-difluorobenzene.

14. A process in accordance with claim 10 wherein said bis-p-halobiphenyl is selected from the group consisting of 4,4'-dibromobiphenyl 4,4'-difluorobiphenyl, 4,4'-diiodobiphenyl, and 4,4'-dichlorobiphenyl.

15. A process in accordance with claim 10 wherein said p-dihalobenzene is p-dichlorobenzene, said bis-p-halobiphenyl is 4,4'-difluorobiphenyl, said organic amide N-methyl-2-pyrrolidone and said alkali metal carboxylate is sodium acetate.

16. A process in accordance with claim 10 wherein said p-dihalobenzene is p-dichlorobenzene, said bis-p-halobiphenyl is 4,4'-dibromobiphenyl, said organic amide is N-methyl-2-pyrrolidone and said alkali metal carboxylate is sodium acetate.

17. A process in accordance with claim 5 wherein said p-dihalobenzene is p-dichlorobenzene.

18. A process in accordance with claim 5 wherein said bis-p-halobiphenyl is 4,4'-difluorbiphenyl.

19. A process in accordance with claim 5 wherein said bis-p-halobiphenyl is 4,4'-dibromobiphenyl.

* * * * *